US006636412B2

(12) United States Patent
Smith

(10) Patent No.: US 6,636,412 B2
(45) Date of Patent: Oct. 21, 2003

(54) HAND-HELD STUN GUN FOR INCAPACITATING A HUMAN TARGET

(75) Inventor: Patrick W. Smith, Scottsdale, AZ (US)

(73) Assignee: Taser International, Inc., Scottsdale, AZ (US)

( * ) Notice: Subject to any disclaimer, the term of this patent is extended or adjusted under 35 U.S.C. 154(b) by 0 days.

(21) Appl. No.: 10/016,082

(22) Filed: Dec. 12, 2001

(65) Prior Publication Data

US 2003/0106415 A1 Jun. 12, 2003

Related U.S. Application Data

(63) Continuation of application No. 09/398,388, filed on Sep. 17, 1999, now abandoned.

(51) Int. Cl.[7] .............................. B64D 1/04; F41F 5/00; F41A 9/53; H01T 23/00

(52) U.S. Cl. .......................... 361/232; 89/1.11; 42/1.01

(58) Field of Search ............................ 89/1.11; 42/1.01, 42/114; 361/232

(56) References Cited

U.S. PATENT DOCUMENTS 3,523,538 A * 8/1970 Shimizu ..................... 128/404
3,803,463 A * 4/1974 Cover ........................ 317/262
4,253,132 A * 2/1981 Cover ........................ 361/232
4,541,191 A * 9/1985 Morris et al. ................. 42/1 A
4,872,084 A * 10/1989 Dunning et al. ............ 361/232
4,982,645 A * 1/1991 Abboud ....................... 89/1.11
5,654,867 A * 8/1997 Murray ....................... 361/232
5,698,815 A * 12/1997 Ragner ....................... 102/502
5,758,448 A * 6/1998 Thummel .................... 42/103
5,786,546 A * 7/1998 Simson ...................... 102/438
5,831,199 A * 11/1998 McNulty, Jr. et al. ....... 89/1.11
5,936,183 A * 8/1999 McNulty, Sr. ............... 89/1.11
5,955,695 A * 9/1999 McNulty, Sr. ............... 89/1.11
5,962,806 A * 10/1999 Coakley et al. ............. 102/502
6,053,088 A * 4/2000 McNulty, Jr. ................ 89/1.11
6,256,916 B1 * 7/2001 McNulty .................... 42/1.08
6,269,726 B1 * 8/2001 McNulty, Sr. ............... 89/1.11
6,360,645 B1 * 3/2002 McNulty, Jr. et al. ....... 89/1.11
6,393,752 B1 * 5/2002 Oliver et al. ................ 42/114

OTHER PUBLICATIONS

M18L Taser Weapon with Integrated Laser Sight, Dec. 11, 2000, web.archive.org/web/20001211135000/http://www.taser.com/index.html, accessed Dec. 1, 2002.*
Advanced Taser M–Series On–Line Owner's Manual, www.taser.com/technical/mmanuals.html, accessed Dec. 1, 2002.*
Advance Taser M–Series EMD Weapons Specifications, www.taser.com/products/advanced01.html, accessed Dec. 1, 2002.*

* cited by examiner

*Primary Examiner*—Charles T. Jordan
*Assistant Examiner*—H. A. Blackner
(74) *Attorney, Agent, or Firm*—Thomas G. Watkins, III

(57) ABSTRACT

A hand-held stun gun incapacitates a human target by generating a series of powerful electrical output pulses across first and second spaced apart output terminals in response to closure of a trigger. A battery power supply includes an electronic switch, an energy storage capacitor and a transformer for converting low voltage, direct current into a series of high voltage output pulses across the first and second output terminals. Each output pulse includes a pulse energy of from 0.9 joules to 10 joules. The series of output current pulses have an RMS current flow of from 100 milliamps to 500 milliamps when the first and second output terminals are applied to a human target.

16 Claims, 4 Drawing Sheets

COMPARISON CHART

| | Stun Gun Brand | Stun Gun Output in Milliamps (RMS) | Stun Gun Output Pulse Width In Microseconds |
|---|---|---|---|
| | Claimed Invention | 162.48 | 13.00 |
| 1. | TP65kV | 26.8 | 2.07 |
| 2. | TP120kV | 25.7 | 3.03 |
| 3. | Om 120kV | 38.2 | 6.17 |
| 4. | Om 150kV | 29.6 | 7.13 |
| 5. | Om SB | 29.8 | 7.52 |
| 6. | Myotron | 64.7 | 3.20 |
| 7. | ZForceI | 29.0 | 1.60 |
| 8. | ZForceII | 31.9 | 1.69 |
| 9. | ZforceIV | 25.3 | 1.81 |
| 10. | Jaycor SS | 42.0 | 1.00 |

FIG. 4

HAND-HELD STUN GUN FOR INCAPACITATING A HUMAN TARGET

BACKGROUND OF THE INVENTION

1. Field of the Invention

This invention relates to apparatus and methods for preventing the locomotion of a human being or animal.

2. Description of the Related Art

The present application is a Continuation application of patent application Ser. No. 09/398,388, filed Sep. 17, 1999 (now abandoned).

The use of electricity to disable human beings and other living targets is well known. In the middle 1800's, electricity was directed through a harpoon to electrocute a whale. Electrocution also came into use as a method of carrying out a death sentence resulting from the commission by a prisoner of a serious crime. While various method of applying lethal electrical impulses are well documented, a weapon for applying non-lethal electrical impulses to disable an attacker is also known. The weapon launches a first dart and a second dart. Each dart remains connected to the weapon by an electrically conductive guide wire. The darts strike an individual. Electrical pulses from the weapon travel to the first dart, from the first dart travel through the individual's body, into the second dart, and return to the weapon via the electrically conductive wire attached to the second dart. The electrical pulses occur at a rate of from two to ten impulses per second, are each about 20 kilovolts, and each deliver from 0.01 to 0.5 joules. U.S. Pat. No. 4,253,132 issued in 1981 describes such a dart weapon. The patent also suggests that pulses in the range of 0.01 to 0.5 joules induce involuntary muscular contractions.

Since about 1981, it has also been know that a certain minor percentage of individual struck with a conventional dart weapon immobilized and can "walk through" the electrical pulses and continue an attack despite being struck with darts from the weapon. The ability of some individuals to walk through the electrical pulses was thought to be an anomaly and usually was not taken seriously because the weapon was effective with and stopped most individuals, and because the weapon when used appeared to "knock down" an individual or animal or appeared to cause the individual or animal to fall. The weapon would also sometimes appear to cause the skin of a human being or animal to twitch. Consequently, it was assumed that the human being or animal was truly physically incapacitated.

I have discovered that an individual can be readily trained to walk through 0.01 to 0.5 joule pulses delivered by a conventional dart weapon. I have been involved in training over twenty individuals, and in each case the individual was, by focusing on a goal, able to ignore and overcome any discomfort from the dart weapon and to continue to walk, run, or attack. The individual did not lose his or her locomotion. In addition, several cases have been reported where the failure of a conventional dart weapon lead to the death of an individual because police officers had to resort to lethal force when the dart weapon failed to stop the individual. As a result of these experiences, it appears that conventional dart weapons cause an individual to fall down by activating sensory neurons and by producing in an individual a psychological reaction which strongly suggests to the individual that he or she is being incapacitated. The discovery that an individual can overcome a conventional dart weapon and continue his or her locomotion suggests possible dire consequences because many police officers in possession of conventional dart weapons mistakenly assume that they are effective against most or many individuals.

Accordingly, it would be highly desirable to provide an improved apparatus and method which would with a high degree of certainty enable a police officer or other individual to incapacitate an attacker.

Therefore, it is a principal object of the invention to provide an improved apparatus and method for halting the locomotion of a human being or other animal.

DESCRIPTION OF THE DRAWINGS

These and other further and more specific objects and advantages of the invention will be apparent to those skilled in the art from the following detailed description thereof, take in conjunction with the drawings, in which:

FIG. 4 represents a chart comparing the pulse width in microseconds and the RMS current in milliamps of the inventive stun gun to the pulse width and output current levels of prior art stun guns.

SUMMARY OF THE INVENTION

Figure 1:
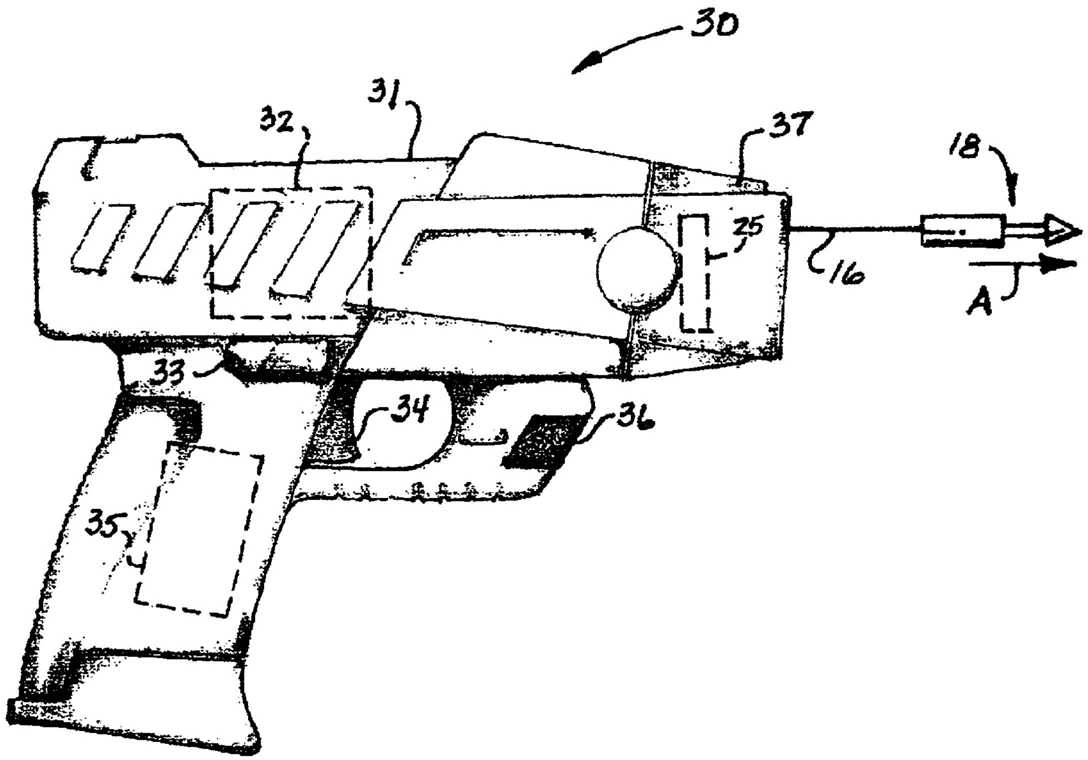
FIG. 1 illustrates a dart weapon constructed in accordance with the principles of the invention.

Briefly, in accordance with my invention, I provide an improved apparatus for preventing locomotion by a living target by causing repeated involuntary contractions of skeletal muscles of the target. The apparatus includes a housing; a first conducting unit for transmitting electrical energy in impulses from the conducting unit to the target; a second conducting unit for transmitting electrical energy from the target to the apparatus; a power supply means for generating energy and including a transformer for delivering electrical energy in impulses to the first conducting unit, and a capacitor for delivering energy in impulses from the capacitor means to the transformer, the capacitor producing and delivering to the transformer from 0.75 to ten joules in each of the impulses from the capacitor; a delivery system for contacting the target with at least a portion of each of the first and second conducting units such that impulses delivered from the first conducting unit to the target travel through at least a portion of the skeletal muscles to the second conducting unit, and produce contractions in the portion of the skeletal muscles which prevents the use by the target of the portion of the skeletal muscles.

In another embodiment of the invention, I provide an improved apparatus for preventing locomotion by a living target by causing repeated involuntary contractions of skeletal muscles of the target. The apparatus includes a housing; a first conducting unit for transmitting electrical energy in impulses from the conducting unit to the target; a second conducting unit for transmitting electrical energy from the target to the apparatus; a power supply means for producing electrical impulses which, when passing through a 1000 ohm resistor, each have a pulse width greater than about ten microseconds and a current in excess of one hundred milliamps; a delivery system for contacting the target with at least a portion of each of the first and second conducting units such that impulses delivered from the first conducting unit to the target travel through at least a portion of the skeletal muscles to the second conducting unit, and produce contractions in the portion of the skeletal muscles which prevents the use by the target of the portion of the skeletal muscles.

In a further embodiment of the invention, I provide an improved method for preventing locomotion by a living target by causing repeated involuntary contractions of skeletal muscles of the target. The method includes the step of apparatus. The apparatus includes a housing; a first conducting unit for, when activated, contacting the target and transmitting electrical energy in impulses from the conducting unit to the target; a second conducting unit for, when activated, contacting the target and transmitting electrical energy from the target to the apparatus; power supply means for, when activated, generating energy and including a transformer for delivering electrical energy in impulses to the first conducting unit, and a capacitor for delivering energy in impulses from the capacitor to the transformer, the capacitor producing and delivering to the transformer from 0.75 to ten joules in each of the impulses from the capacitor; a delivery system for, when activated, contacting said target with at least a portion of each of the first and second conducting units such that impulses delivered from the first conducting unit to the target travels through at least a portion of the skeletal muscles to the second conducting unit, and the impulses produce contractions in the portion of the skeletal muscles which prevents the use by the target of the portion of the skeletal muscles; and, an activation system operable to activate the power supply, the first conducting unit, the second conducting unit, and the delivery system. The method also includes the step of operating the activation system to contact the target with the first contacting unit and the second conducting unit, to deliver from the capacitor to the transformer pulses each containing 0.75 to ten joules, and, to deliver from the transformer to the first conducting unit electrical energy in impulses.

In still another embodiment of the invention, I provide an improved method for preventing locomotion by a living target by causing repeated involuntary contractions of skeletal muscles of the target. The method includes the step of apparatus. The apparatus includes a housing; a first conducting unit for, when activated, contacting the target and transmitting electrical energy in impulses from the conducting unit to the target; a second conducting unit for, when activated, contacting the target and transmitting electrical energy from the target to the apparatus; power supply means for, when activated, generating energy and including a transformer for delivering electrical energy in impulses to the first conducting unit, and a capacitor for delivering energy in impulses from the capacitor to the transformer, the capacitor producing and delivering to the transformer impulses which, when passing through a 1000 ohm resistor, have a pulse width greater than about ten microseconds and a current in excess of one hundred milliamps; a delivery system for, when activated, contacting said target with at least a portion of each of the first and second conducting units such that impulses delivered from the first conducting unit to the target travels through at least a portion of the skeletal muscles to the second conducting unit, and the impulses produce contractions in the portion of the skeletal muscles which prevents the use by the target of the portion of the skeletal muscles; and, an activation system operable to activate the power supply, the first conducting unit, the second conducting unit, and the delivery system. The method also includes the step of operating the activation system to contact the target with the first contacting unit and the second conducting unit, to deliver from the capacitor to the transformer electrical impulses, and, to deliver from the transformer to the first conducting unit impulses which, when passing through a 1000 ohm resistor, have a pulse width greater than about ten microseconds and a current in excess of one hundred milliamps.

In still a further embodiment of the invention, I provide improved apparatus for preventing locomotion by a living target by causing repeated involuntary contractions of skeletal muscles of the target. The apparatus includes a housing; a first conducting unit for transmitting electrical energy in impulses from the conducting unit to the target; a second conducting unit operatively associated with the first conducting unit for transmitting electrical energy from the target to the apparatus; a first transformer for delivering electrical energy in impulses to the first conducting unit; a third conducting unit for transmitting electrical energy in impulses from the third conducting unit to the target; a fourth conducting unit operatively associated with the third conducting unit to transmit electrical energy from the target to the apparatus; a second transformer for delivering electrical energy in impulses to the third conducting unit; a power unit for delivering electrical energy to the first and second transformers; and, a switch unit operatively associated with the power unit to deliver electrical energy to both of the first and second transformers.

In yet still a further embodiment of my invention, I provide improved apparatus for preventing locomotion by a living target by causing repeated involuntary contractions of skeletal muscles of the target. The apparatus includes a housing; a first conducting unit to transmit electrical energy in impulses from the conducting unit to the target; a second conducting unit for transmitting electrical energy from the target to the apparatus; a power supply for generating energy and including a transformer for delivering electrical energy in impulses to the first conducting unit, and a capacitor for delivering energy in impulses from the capacitor to the transformer; and, memory for storing data concerning the use of the apparatus.

In yet still another embodiment of my invention, I provide improved apparatus for preventing locomotion by a living target by causing repeated involuntary contractions of skeletal muscles of the target. The apparatus includes a housing; a first conducting unit for transmitting electrical energy in impulses from the conducting unit to the target; a second conducting unit for transmitting electrical energy from the target to the apparatus; at least one light source mounted on the apparatus for sighting the apparatus on the target; a power supply for generating energy and including a transformer for delivering electrical energy in impulses to the first conducting unit, including a capacitor for delivering energy in impulses from the capacitor to the transformer means, and providing power for the light source.

DETAILED DESCRIPTION OF THE INVENTION

Turning now to the drawings, which depict the presently preferred embodiments of the invention for purpose of illustrating the invention and not by way of limitation of the scope of the invention, and in which like reference characters refer to corresponding elements throughout the several views, FIG., 1 illustrates a hand held stun gun 30 constructed in accordance with the principles of the invention and including housing 31, trigger 34 mounted in housing 31, microprocessor 32 mounted in housing 31, safety 33 mounted in housing 31, battery or batteries 35 mounted in housing 31, laser sight 36 mounted in housing 31, and cartridge 37 removably mounted in housing 31. Cartridge 37 includes at least a first electrically conductive dart 18 and a second electrically conductive dart (not visible). Each dart is connected to cartridge 37 by a elongate electrically conductive wire 16. Wire 16 typically is coiled in cartridge 37 and unwinds and straightens as the dart 18 travels through the air in the direction of arrow A toward a target. The length of wire 16 can vary but is typically twenty to thirty feet. Two or more cartridges 37 can be mounted on stun gun 30.

Cartridge 37 also includes a powder charge, compressed air, or some other motive power means 25 for firing each dart 18 through the air in the direction of arrow A toward a target. The powder charges, compressed air, etc. utilized to fire a dart are well known in the art and will not be discussed in detail herein. Cartridge 37 is activated and the darts 18 are fired by manually sliding safety 33 in a selected direction to release safety 33 and by then squeezing trigger 34. As will be described, the means for generating the electrical pulses which travel into wire 16 and dart 18 is also activated by squeezing trigger 34. Releasing safety 33 also activates or turns on the laser sight 36 such that at least one laser beam projects outwardly in the direction of arrow A and impinges on the desired target.

Microprocessor 32 preferably includes memory and includes a sensor attached to trigger 34 or to some other desired portion of the hand held stun gun to generate for the memory in microprocessor 32 a signal each time trigger 34 is squeezed and the stun gun 30 is fired. Each time trigger 34 is squeezed and stun gun 30 is fired, the memory in the microprocessor 32 retains a record of the date and time the weapon was fired.

Figure 2:
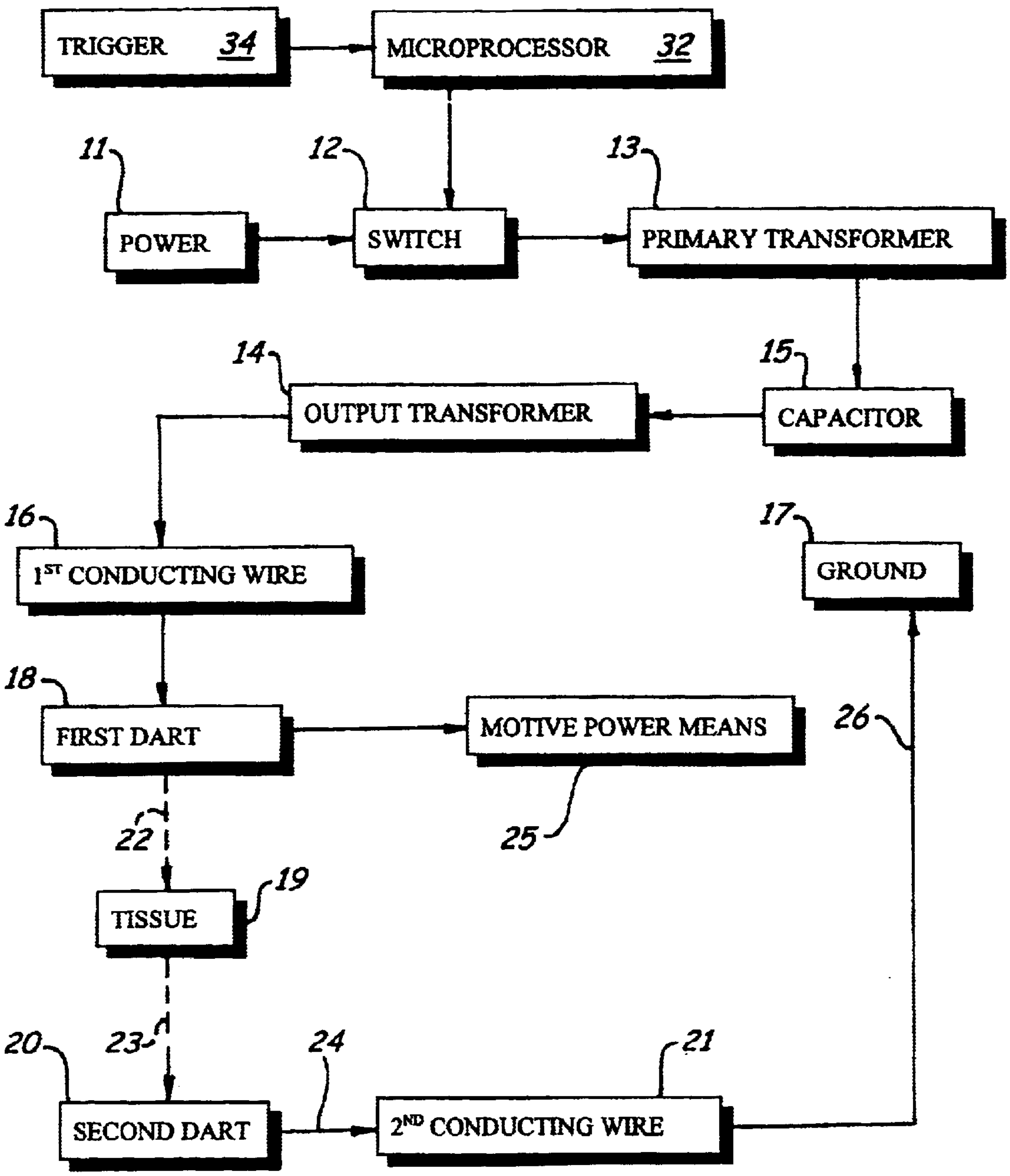
FIG. 2 is a block flow diagram of components of the dart weapon of FIG. 1 illustrating the mode of operation thereof; and, FIG. 3 is a block flow diagram illustrating an alternate embodiment of the invention.

In FIG. 2, power 11 is presently provided by a nine volt battery 35. Power 11 can be provided by any desired apparatus or means. Switch 12 ordinarily is "off." When switch 12 is turned on, it allows power 11 to travel to the primary transformer 13. When trigger 34 is squeezed to fire stun gun 30, a signal is generated which is received by microprocessor 32. Microprocessor 32 sends a signal to switch 12 to turn switch 12 on for about seven seconds. Any mechanical or other means can be utilized in place of microprocessor 32 to operate a switch 12. Switch 12 can be mechanical, constructed from semiconductor materials, or constructed from any other desired materials.

Primary transformer 13 receives electricity from battery 35 and produces a signal which causes 2,000 volts to be transmitted to and stored in a capacitor 15. Once the capacitor 15 stores 2,000 volts, it is able to discharge an electrical pulse into output transformer 14. The pulse from capacitor 15 is a 0.80 to 10 joule pulse, and has a pulse width of 9 microseconds to 100 microseconds. Two to forty, preferably about five to fifteen, pulses per second are produced by capacitor 15. A 0.88 uF capacitor is presently preferred, although the size of the capacitor can vary as desired. The voltage stored by capacitor 15 can vary as desired as long as the capacitor produces a 0.90 joule to 10 joules, preferably 1.5 joules to 5.0 joules, pulse.

Output transformer 14 receives each pulse from capacitor 15 and produces a fifty thousand volt pulse. The voltage of the pulse from output transformer 14 can vary as desired as long as each pulse from output transformer 14 includes from 0.75 to 9 joules, preferably 1.0 to 3.0 joules, of energy, has a pulse width in the range of 10 microseconds to 100 microseconds, and has a current:

$$I_{rms}=[I^2_{peak}\times\text{Pulsewidth}\times\text{Rep Rate}]^{1/2}$$

This current is in the range of 100 mA to 500 mA. The pulse widths and currents of conventional stun guns and of the present invention are set forth in the FIG. 4 comparison chart.

In the practice of the invention, it is critical to produce contractions of skeletal muscles sufficient to prevent the voluntary use of the muscles encountered during normal locomotion of an individual's body. Twitching of the skin does not, as earlier noted, necessarily indicate that contractions of the skeletal muscle necessary to prevent locomotion are taking place. Producing contractions of smooth muscle is not sufficient in the practice of the invention. Contractions must instead be produced in striated skeletal muscles. Further, the contractions in the skeletal muscles must be sufficient to prevent voluntary use of the skeletal muscles by individual—i.e., the muscles must lock up and not be operable. The electrical pulses produced by prior art dart weapons do not prevent the use of the skeletal muscles and do not prevent locomotion of an individual. It is not the object of the invention to cause all the skeletal muscles of an individual to lock up, but only some portion of the skeletal muscles. Based on tests to date, the discomfort and loss of locomotion caused when skeletal muscles lock up in response to impulses produced by the apparatus of the invention is almost always sufficient to halt the locomotion of an individual. In actual tests, over twenty volunteers were each given the task of advancing to a target at least five feet away and of simulating an attack. Each test was repeated using the invention described herein. After being hit with darts from the weapon of the invention, each volunteer was immediately immobilized and dropped to the ground. None of the volunteers was able to advance toward or reach the target.

The profile of pulses used in prior art electric weapons is deficient in several respects. First, the energy produced by the pulses is in the range of 0.01 to 0.5 joules. This is outside the range of 0.9 joule to 10 joules required in each pulse produced in the apparatus of the invention. Second, the width of each pulse in prior art apparatus is about one to seven and a half microseconds. The pulse width in the apparatus of the invention must be nine to one hundred microseconds. Third, the current in each pulse produced by prior art apparatus is in the range of about twenty to sixty-five milliamps. The current in each pulse produced in the apparatus of the invention must be in the range of one hundred to five hundred milliamps. In addition, the pulses must be delivered to a target to produce actual contractions of skeletal muscles sufficient to prevent use of the muscles by the individual subjected to the pulses.

If contractions of skeletal muscles are not produced, the apparatus of the invention is not functioning in the manner desired. If there are no contractions of the skeletal muscles, the individual can "walk through", or be trained to walk through, being hit with darts which conduct electricity through the individual's body.

If contractions of skeletal muscles are produced, but do not prevent voluntary use of the muscles by the individual subjected to the pulses, then the invention is not functioning as desired. If contractions of the skeletal muscles do not prevent voluntary use of the muscles by the individual, the individual can "walk through", or be trained to walk through, being hit with darts which conduct electricity through the individual's body.

In operation, in FIG. 2 trigger 34 is pressed to send a signal to microprocessor 32. Microprocessor 32 opens switch 12. Power 11 flows through primary transformer 13, capacitor 15, and output transformer 14 in the manner discussed. The output from output transformer 14 goes into wire 16 and dart 18. Once the current flow reaches dart 18, current from dart 18 is directed by wire 27 to motive power means 25 (i.e., black powder) to activate motive power means 25 to project the first and second darts 18 and 20 through the air in the direction of arrow A to the individual who is the target. When the darts contact the clothing of the individual near the individual's body or contact the individual's body, pulses from dart 18 travel 22 into tissue 19 in the individual's body, from the tissue 19 into 23 the second dart 20, from the second dart 20 into 24 the second conducting wire 21, and through 26 the second connecting wire 21 to the ground 17 in the weapon. Pulses are delivered from dart 18 into tissue 19 for about six to seven seconds. The pulses cause contraction of skeletal muscles and make the muscles inoperable, preventing use of the muscles in locomotion of the individual's skeleton.

Figure 3:
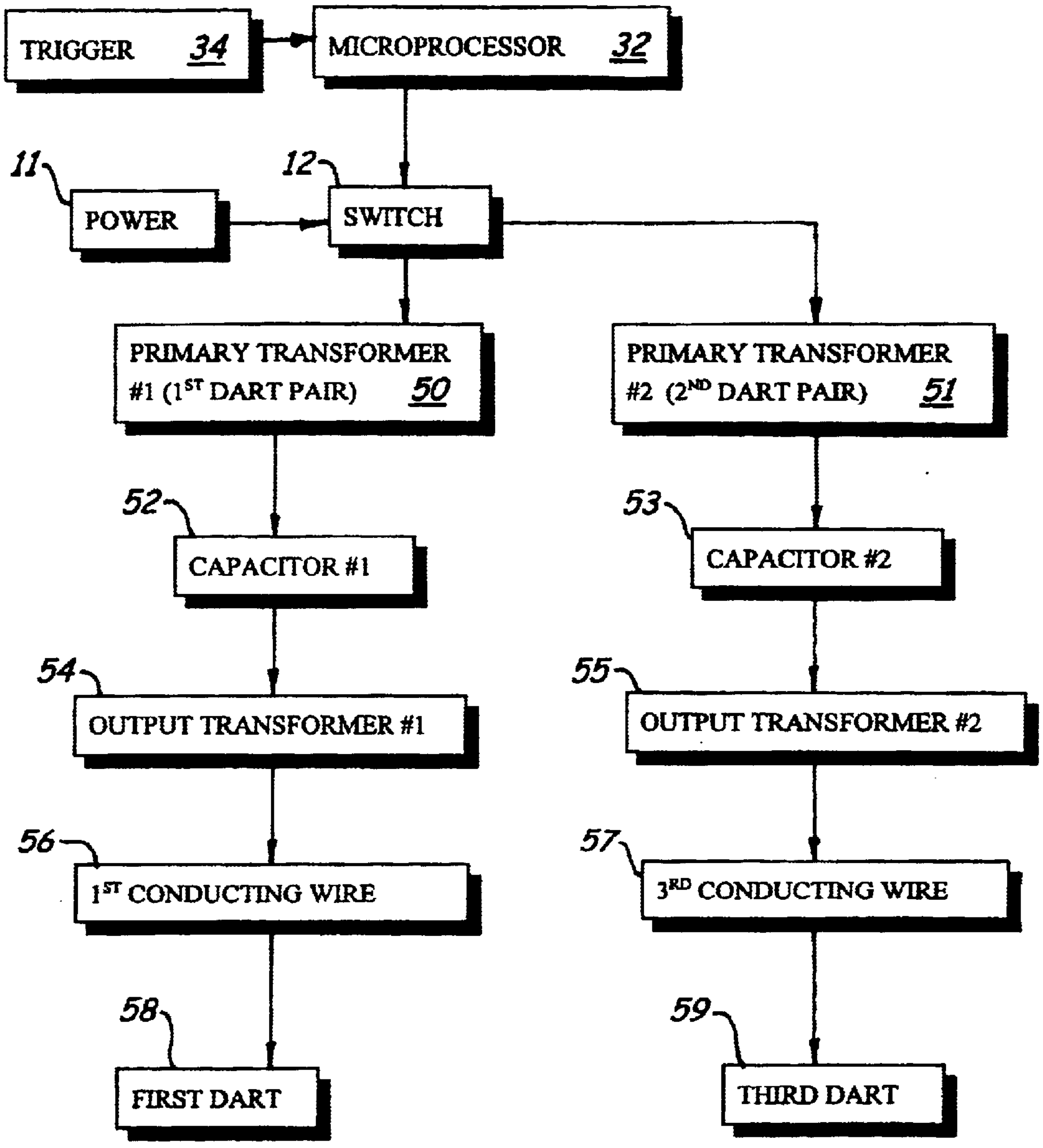

FIG. 3 illustrates an alternate embodiment of the invention in which stun gun 30 includes at least two cartridges. The first cartridge includes a primary transformer 50, a capacitor 52, an output transformer 54, a first conducting wire 56 connected to the output transformer 54, and a first dart 58 connected to the first conducting wire 56. A second conducting wire and second dart (not shown) are also included in the first cartridge, are operatively associated with the first conducting wire 56 and first dart 58, and are electrically connected to a ground in stun gun 30. Both the first and second darts are shot simultaneously, as are the darts described in connection with FIG. 2. The first dart 58 delivers electrical pulses to tissue in an individual's body. The second dart receives electricity from the tissue and returns the electricity to the weapon via the second conducting wire. The first dart 58 is connected to motive power means in the first cartridge in much the same manner that dart 18 is connected to motive power means 25 in FIG. 2.

The second cartridge includes a primary transformer 51, a capacitor 53, an output transformer 55, a third conducting wire connected to the output transformer 55, and a third dart 59 connected to the wire 57. A fourth conducting wire and fourth dart (not shown) are also included in the second cartridge, are operatively associated with the third conducting wire 57 and third dart 59, and are electrically connected to a ground in stun gun 30. Both the third and fourth darts are shot simultaneously, as are the darts in FIG. 2. The third dart 59 delivers electrical pulses to tissue in an individual's body. The fourth dart receives electricity from the tissue and returns the electricity to the weapon via the fourth conducting wire. The third dart 59 is connected to motive power means in the second cartridge in much the same manner that dart 18 is connected to motive power means 25 in FIG. 2.

When trigger 34 is depressed the first time, microprocessor 32 sends out a signal which causes switch 12 to route power to primary transformer 50 such that the first dart 58 and second dart are fired simultaneously into contact with a target individual's body and pulses are delivered into the target individual's body through first dart 58. When trigger 34 is depressed the second time, microprocessor 32 sends out a signal which causes switch 12 to route power to primary transformer 51 such that the third dart 59 and fourth dart are fired simultaneously into contact with a target individual's body and pulses are delivered into the target individual's body through third dart 59. If desired, microprocessor 32 can be programmed such that switch 12 permits power 11 to flow simultaneously both to primary transformer 50 and to primary transformer 51 such that the first 58, second, third 59, and fourth darts are fired simultaneously. Consequently, the embodiment of the invention set forth in FIG. 3 enables both pairs of darts to be fired, either sequentially or simultaneously.

In another embodiment of the invention of FIG. 3, only one of primary transformers 50, 51 is utilized and switch 12 is positioned intermediate the primary transformer and capacitors 52, 53. In this embodiment, microprocessor 32 (or any other desired mechanical or other means) controls switch 12 so that when trigger 34 is squeezed to fire stun gun 30, power 11 flowing through the one primary transformer 50, 51 utilized is directed by switch 12 (1) to capacitor 52 to fire the first dart 58 and second dart, (2) to capacitor 53 to fire the third dart 59 and fourth dart, or (3) simultaneously to capacitors 52 and 53 to fire the first dart 58, second dart, third dart 59, and fourth dart simultaneously.

In another embodiment of the invention of FIG, 3, only one of primary transformers 50, 51 is utilized and only one of capacitors 52, 53 is utilized and switch 12 is positioned intermediate the capacitor and output transformers 54, 55. In this embodiment, microprocessor 32 controls switch 12 so that when trigger 34 is squeezed to fire stun gun 30, power 11 flowing through the one primary transformer 50, 51 utilized and through the one capacitor 52, 54 utilized is directed by switch 12 (1) to output transformer 54 to fire the first dart 58 and the second dart, (2) to output transformer 55 to fire the third dart 59 and fourth dart, or (3) simultaneously to output transformers 54 and 55 to fire simultaneously the first dart 58, second, third dart 59, and fourth darts.

The particular advantage of the switching arrangement just discussed with respect to FIG, 3 is that the voltage being switched is much less than in the prior art stun guns. In prior art stun nuns only a single output transformer 54, 55 is typically used and a switch is used to direct output from the single transformer either to the first and second dart pair or the third and fourth dart pair. Attempting to route 50,000 volts is difficult, and in some cases both dart pairs fire at the same time even though the 50,000 volts is routed to only one of the dart pairs.

Having described my invention in such terms as to enable those skilled in the art to understand and practice it, and having identified the presently preferred embodiments thereof, I claim:

1. A hand-held stun gun for incapacitating a human target by generating a series of powerful electrical output pulses across first and second spaced apart output terminals in response to closure of a trigger, comprising:

a. a housing for enclosing a battery power supply and for supporting the trigger and first and second output terminals;

b. a power supply having an electronic switch, an energy storage capacitor and a transformer for converting low voltage, direct current from the battery power supply into a series of high voltage output pulses across the first and second output terminals, each output pulse having a pulse energy of from 0.9 joules to 10 joules and wherein the series of out-put current pulses have an RMS current flow of from 100 milliamps to 500 milliamps when the first and second output terminals are applied to the human target.

2. The stun gun of claim 1 wherein each output current pulse transfers at least about 0.9 joules of energy from the first and second output terminals to the human target.

3. The stun gun of claim 1 wherein the duration of each output pulse extends from 10 microseconds to 100 microseconds.

4. The stun gun of claim 3 further including a cartridge mechanically coupled to the stun gun housing, wherein the cartridge includes first and second spaced apart, launchable darts coupled by first and second spoolable wires to the first and second stun gun output terminals.

5. The stun gun of claim 4 wherein the voltage level and charge stored in the energy storage capacitor is sufficient to generate pulses having an energy content of from 0.9 joules to 10 joules.

6. The stun gun of claim 5 wherein the power supply produces the high voltage pulses at a pulse repetition rate of from 2 to 40 pulses per second.

7. The stun gun of claim 6 wherein the capacitance of the capacitor is rated at or above 0.88 microFarads.

8. The stun gun of claim 1 wherein each output pulse includes a pulse energy of from 1 to 3 joules.

9. The stun gun of claim 8 wherein the duration of each output pulse extends from 10 microseconds to 100 microseconds.

10. The stun gun of claim 9 wherein the power supply produces the high voltage pulses at a pulse repetition rate of from 2 to 40 pulses per second.

11. The stun gun of claim 10 wherein the capacitance of the capacitor is rated at or above 0.88 microFarads.

12. A method for generating a series of high pulse current and high pulse energy electrical output pulses across first and second spaced apart stun gun output terminals in response to closure of a trigger for incapacitating a human target comprising the steps of:

a. activating a battery powered power supply having an electronic switch in response to trigger closure to generate a high voltage output;

b. directing the high voltage output into an energy storage capacitor for storing from 0.9 to 10 joules of high voltage electrical energy in the energy storage capacitor;

c. periodically discharging the energy storage capacitor through a transformer to generate a series of very high voltage output pulses across the first and second stun gun output terminals wherein the series of output current pulses have an RMS current flow of from 100 milliamps to 500 milliamps when the first and second output terminals are applied to the human target.

13. The method of claim 12 including the further step of transferring from 0.9 to 10 joules of energy through the first and second output terminals into the human target.

14. The method of claim 13 including the further step of controlling the duration of the capacitor discharge cycle to a time between 10 and 100 microseconds.

15. The method of claim 12 wherein each output pulse includes a pulse energy level of from 1 to 3 joules.

16. A hand-held stun gun for generating a series of powerful electrical output pulses across first and second spaced apart output terminals in response to closure of a trigger, comprising:

a. a housing for enclosing a battery power supply and for supporting the trigger and first and second output terminals;

b. a power supply having an electronic switch, an energy storage capacitor and a transformer for converting low voltage, direct current from the battery power supply into a series of high voltage output pulses across the first and second output terminals, each output pulse having a pulse energy of from 0.9 joules to 10 joules and wherein the series of output current pulses have an RMS current flow of from 100 milliamps to 500 milliamps when the first and second output terminals are applied to a human target.

* * * * *